(12) United States Patent
Kim

(10) Patent No.: US 12,365,317 B2
(45) Date of Patent: Jul. 22, 2025

(54) BRAKING APPARATUS FOR VEHICLE AND CONTROL METHOD THEREFOR

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 216 days.

(21) Appl. No.: 18/215,949

(22) Filed: Jun. 29, 2023

(65) Prior Publication Data

US 2024/0075912 A1 Mar. 7, 2024

(30) Foreign Application Priority Data

Sep. 5, 2022 (KR) .......... 10-2022-0112172

(51) Int. Cl.
*B60T 8/172* (2006.01)
*B60T 8/1763* (2006.01)
*B60T 8/1766* (2006.01)

(52) U.S. Cl.
CPC .......... *B60T 8/172* (2013.01); *B60T 8/17636* (2013.01); *B60T 8/1766* (2013.01); *B60T 2210/12* (2013.01)

(58) Field of Classification Search
CPC .. B60T 13/58; B60T 13/147; B60T 13/17616; B60T 13/741; B60T 13/745;
(Continued)

(56) References Cited

U.S. PATENT DOCUMENTS

2005/0168063 A1* 8/2005 Tani ............... B60T 8/3225
 303/113.5
2014/0145498 A1* 5/2014 Yamakado ........ B60T 8/245
 303/3

(Continued)

*Primary Examiner* — John Kwon
(74) *Attorney, Agent, or Firm* — Morgan, Lewis & Bockius LLP

(57) ABSTRACT

A braking apparatus of a vehicle and a method of controlling the same are provided. The method of controlling the braking apparatus of a vehicle includes determining whether a brake request signal is input; determining whether an amount of change in the brake request signal is equal to or greater than a preset standard; comparing a slip ratio of a front wheel portion with a slip ratio of a rear wheel portion in response to a determination that the amount of change in the brake request signal is equal to or less than the preset standard; reducing a braking force of a shaft having a large slip ratio of the front wheel portion and the rear wheel portion and increasing a braking force of a shaft having a small slip ratio, based on a comparison result after the comparing of the slip ratio of the front wheel portion with the slip ratio of the rear wheel portion; moving a braking distribution ratio formed based on the increased or reduced braking forces of the front wheel portion and the rear wheel portion from an actual braking curve to an ideal braking curve, after the reducing of the braking force of the shaft having a large slip ratio of the front wheel portion and the rear wheel portion and the increasing of the braking force of the shaft having a small slip ratio; and braking the vehicle based on the braking distribution ratio on the actual braking curve or the moved braking distribution ratio on the ideal braking curve.

11 Claims, 5 Drawing Sheets

(58) Field of Classification Search
CPC ...... B60T 7/12; B60T 8/1755; B60T 2201/06; B60T 2270/10; B60T 2270/30
See application file for complete search history.

(56) References Cited

U.S. PATENT DOCUMENTS

| | | | |
|---|---|---|---|
| 2016/0096434 A1* | 4/2016 | Nakaoka | B60W 10/192 |
| | | | 701/78 |
| 2023/0174036 A1* | 6/2023 | Saotome | B60T 8/17616 |
| | | | 701/78 |
| 2025/0018760 A1* | 1/2025 | Yoshida | B60W 40/10 |

* cited by examiner

BRAKING APPARATUS FOR VEHICLE AND CONTROL METHOD THEREFOR

CROSS-REFERENCE TO RELATED APPLICATION

The present application claims priority to Patent Application No. 10-2022-0112172, filed on Sep. 5, 2022 in Korea, the entire contents of which are incorporated herein by reference.

TECHNICAL FIELD

The present disclosure relates to a braking apparatus and a method of controlling the same.

BACKGROUND

The contents described in the present disclosure simply provide background information for the present disclosure and do not constitute prior art.

An Electro-Mechanical Brake (EMB) is a device that generates a braking force without using hydraulic pressure by being equipped with an actuator driven by a caliper, a drum, and a motor. The EMB is capable of braking each wheel independently, and thus, can implement not only main braking but also functions such as an Anti-lock Braking System (ABS), an Electronic Stability Control (ESC), a Traction Control System (TCS), and an Autonomous Emergency Braking (AEB). In addition, since the EMB generates a braking force using an electrical signal, the EMB can implement higher performance than a hydraulic brake that brakes a vehicle using hydraulic pressure.

When the vehicle brakes, in a case where a braking force that restrains a brake disk is greater than a braking force determined by a frictional force of a road surface, wheel lock phenomenon occurs on the wheel of the vehicle, and an Anti-lock Braking System (ABS) function is activated.

FIG. 1 is a Cartesian coordinate illustrating a distribution of a braking force of a front wheel portion and a braking force of a rear wheel portion according to the prior art.

Referring to FIG. 1, an actual braking curve is a curve illustrating a braking distribution ratio of a front wheel portion and a rear wheel portion based on a cross-sectional area of a caliper piston of a hydraulic brake.

In the case of a hydraulic braking system, the braking force of the front wheel portion and the rear wheel portion, that is, the hydraulic pressure, is calculated in response to a size of a piston. Here, the braking distribution ratio of the hydraulic braking system is formed based on the actual braking curve. The actual braking curve is a linear function corresponding to the braking forces of the front wheel portion and the rear wheel portion. A slope of the actual braking curve may be calculated based on the piston size.

When the vehicle brakes, a load of the vehicle is additionally applied to the front wheel portion in proportion to a deceleration of the vehicle. When the load of the vehicle is additionally applied to the front wheel portion, the braking force required for both the front wheel portion and the rear wheel portion increases, but the front wheel portion requires a braking force larger than that of the rear wheel portion, and the rear wheel portion requires a braking force smaller than that of the front wheel portion. An ideal braking curve is a curve representing a braking distribution ratio of the front wheel portion and the rear wheel portion based on a load change of the vehicle when the vehicle brakes.

When generating braking force on the front wheel portion and the rear wheel portion of the vehicle based on a pedal signal, the braking distribution ratio of the front wheel portion and the rear wheel portion is determined by considering a curb vehicle weight condition of the vehicle and a gross vehicle weight condition of the vehicle. The braking force may be generated on the front wheel portion and the rear wheel portion of the vehicle based on the determined braking distribution ratio.

Based on a target deceleration/acceleration of the vehicle, a front wheel lock limit line and the rear wheel lock limit line on the ideal braking curve can be derived. When the target deceleration/acceleration of the vehicle is, for example, 1 g, the front wheel lock limit line and the rear wheel lock limit line are derived from a point corresponding to the target deceleration/acceleration 1 g on the ideal braking curve. Here, when the braking distribution ratio of the front wheel portion and the rear wheel portion are outside ranges of the front wheel lock limit line and the rear wheel lock limit line, the wheel lock phenomenon occurs in the vehicle.

When the friction coefficient of the road surface is low or the load of the vehicle increases, the target deceleration/acceleration of the vehicle changes, and the front wheel lock limit line and the rear wheel lock limit line also change in response to the changed target deceleration/acceleration. After the front wheel lock limit line and the rear wheel lock limit line change, when the vehicle is controlled based on the braking distribution ratio on the actual braking curve, the distribution of the braking force of the front wheel portion or the braking force of the rear wheel portion may deviate from the front wheel lock limit line or the rear wheel lock limit line, and the wheel lock phenomenon may occur in the vehicle.

When traveling conditions such as the target deceleration/acceleration of the vehicle, the vehicle load, and the friction coefficient of the road surface change, since the hydraulic braking system determines the braking force according to the braking distribution ratio of the front wheel portion and the rear wheel portion which are based on a cross sectional area of the caliper piston of the hydraulic brake, there is a problem that variable braking distribution outside the actual braking curve is impossible.

Therefore, it is necessary to develop a technology capable of increasing braking efficiency of a vehicle by generating the braking forces of the front wheel portion and the rear wheel portion based on the braking distribution ratio that satisfies a traveling condition of the vehicle and slowing down the wheel lock phenomenon of the vehicle.

SUMMARY

The present disclosure provides a braking device of a vehicle and a method of controlling the same which may generate braking forces of a front wheel portion and a rear wheel portion based on a braking distribution ratio satisfying a traveling condition of a vehicle using an Electro-Mechanical Brake (EMB) and slow down wheel lock phenomenon of the vehicle to increase braking efficiency of the vehicle.

The present disclosure provides a braking device of a vehicle and a method of controlling the same capable of shortening a braking distance of the vehicle by maximizing braking efficiency and braking performance of the vehicle.

The problems solvable by the present disclosure are not limited to the problems mentioned above, and other problems not mentioned will be clearly understood by those having ordinary skill in the art from the description below.

An embodiment of the present disclosure provides a method of braking a vehicle including: determining whether a brake request signal is input; determining whether an amount of change in the brake request signal is equal to or greater than a preset standard; comparing a slip ratio of a front wheel portion with a slip ratio of a rear wheel portion when determination is made that the amount of change in the brake request signal is equal to or less than the preset standard; reducing a braking force of a shaft having a large slip ratio of the front wheel portion and the rear wheel portion and increasing a braking force of a shaft having a small slip ratio, based on a comparison result after the comparing of the slip ratio of the front wheel portion with the slip ratio of the rear wheel portion; moving a braking distribution ratio formed based on the increased or reduced braking forces of the front wheel portion and the rear wheel portion from an actual braking curve to an ideal braking curve, after the reducing of the braking force of the shaft having a large slip ratio of the front wheel portion and the rear wheel portion and the increasing of the braking force of the shaft having a small slip ratio; and braking the vehicle based on a braking distribution ratio on the actual braking curve or the ideal braking curve.

Another embodiment of the present disclosure provides a braking apparatus of a vehicle including: a sensor unit configured to measure a slip ratio of a front wheel portion and a slip ratio of a rear wheel portion to calculate a braking distribution ratio of the front wheel portion including a plurality of front wheels and the rear wheel portion including a plurality of rear wheels; a control unit configured to change braking forces of the front wheel portion and the rear wheel portion based on the slip ratio of the front wheel portion and the slip ratio of the rear wheel portion measured by the sensor unit and perform control to brake the vehicle based on a braking distribution ratio on an actual braking curve or an ideal braking curve; and a drive unit including a front wheel driving apparatus which generates the braking force on the front wheel portion and a rear wheel driving apparatus which generates the braking force on the rear wheel portion based on the control of the control unit.

In one embodiment of the present disclosure, according to the braking device of a vehicle and the method of controlling the device, it is possible to generate braking forces of a front wheel portion and a rear wheel portion based on a braking distribution ratio satisfying a traveling condition of a vehicle using an Electro-Mechanical Brake (EMB) and slowing down a wheel lock phenomenon of the vehicle to increase braking efficiency of the vehicle.

In one embodiment of the present disclosure, according to the braking device of a vehicle and the method of controlling the device, it is possible to shorten a braking distance of the vehicle by maximizing braking efficiency and braking performance of the vehicle.

DETAILED DESCRIPTION

Figure 1:
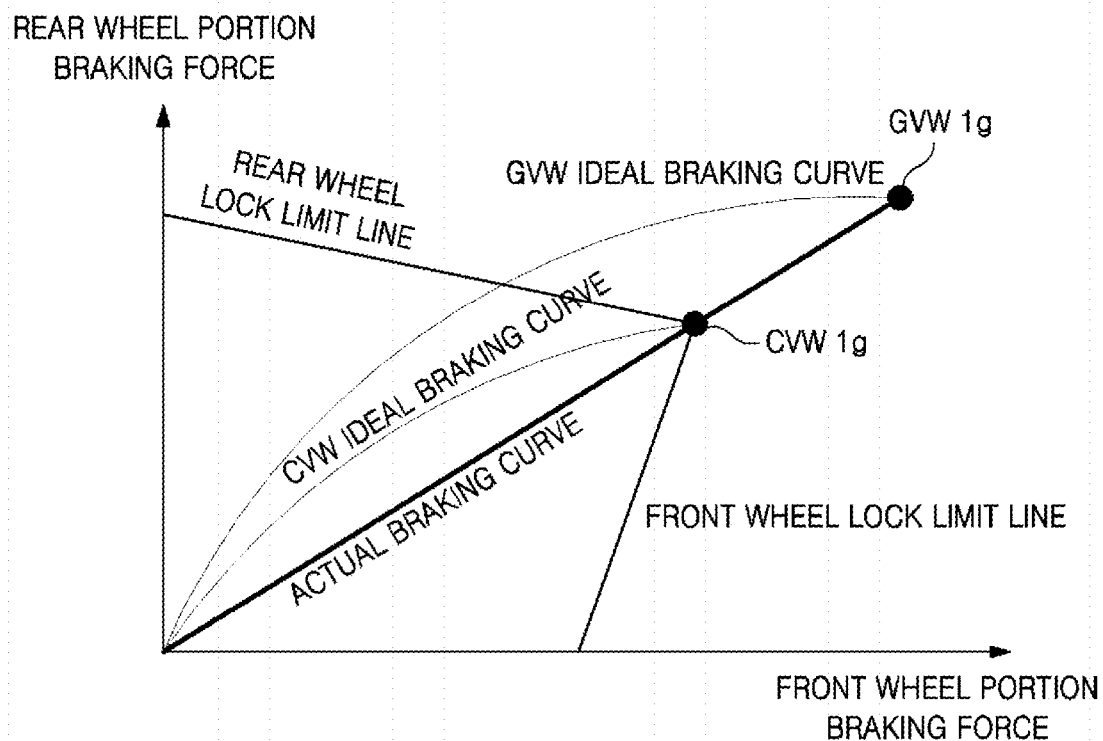
FIG. 1 is a Cartesian coordinate illustrating a distribution of a braking force of a front wheel portion and a braking force of a rear wheel portion according to the prior art.

Hereinafter, some exemplary embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary.

Figure 2:
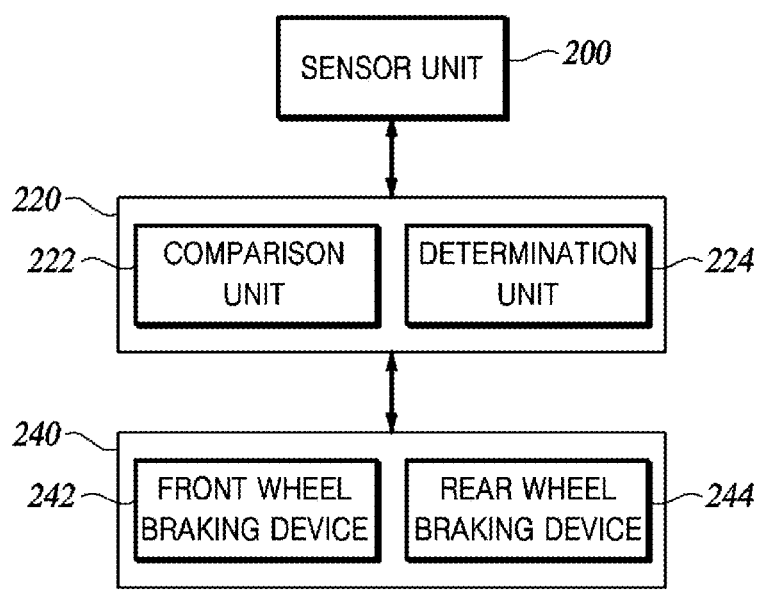
FIG. 2 is a block configuration diagram schematically illustrating a braking device of a vehicle according to one embodiment of the present disclosure.

FIG. 2 is a block configuration diagram schematically illustrating a braking device of a vehicle according to one embodiment of the present disclosure.

Referring to FIG. 2, the braking device of a vehicle may include a sensor unit 200, a control unit 220, and a drive unit 240.

The sensor unit 200 may include some or all of a wheel speed sensor (not illustrated), an optical sensor (not illustrated), an acoustic sensor (not illustrated), a pedal pressure sensor, and a pedal stroke sensor.

A method of measuring a slip ratio of a vehicle may include a method of measuring a wheel speed by the sensor unit 200 using a wheel speed sensor connected to each wheel of the vehicle and comparing the measured wheel speed and a speed of the vehicle, and a method of measuring the slip ratio of a vehicle based on strain and stress measured by a strain gauge by placing the strain gauge on the tire tread. In addition, the sensor unit 200 may estimate the characteristics of the road surface using an optical sensor and reflection of light emitted on the road surface.

The sensor unit 200 may measure a pedal effort applied to a pedal of a vehicle using the pedal pressure sensor and the pedal stroke sensor. The pedal pressure sensor may measure pressure in a pedal cylinder connected to a brake pedal (not illustrated) and measure the pedal effort applied to the pedal based on the measured pressure. The pedal stroke sensor detects a stroke of the brake pedal and transmits the detected signal to the control unit 220. Based on a pedal stroke and displacement of the brake pedal detected by the pedal stroke sensor, the control unit 220 may control braking forces of a front wheel portion and a rear wheel portion.

The control unit 220 may include a comparison unit 222 and a determination unit 224. According to an exemplary embodiment of the present disclosure, the control unit 220 may include a processor (e.g., computer, microprocessor, CPU, ASIC, circuitry, logic circuits, etc.) and an associated non-transitory memory storing software instructions which, when executed by the processor, provides the functionalities of the comparison unit 222 and the determination unit 224. Herein, the memory and the processor may be implemented as separate semiconductor circuits. Alternatively, the memory and the processor may be implemented as a single integrated semiconductor circuit. The processor may embody one or more processor(s).

The comparison unit 222 may include a monitoring unit (not illustrated). When the vehicle brakes, the monitoring unit may monitor the slip ratio generated in the front wheel portion and the rear wheel portion measured by the sensor unit 200. In one embodiment of the present invention, the slip ratio is not a threshold for determining whether a wheel lock phenomenon of an anti-lock braking system (ABS) occurs, but a value measured to compare the slip ratios of the front wheel portion and the rear wheel portion. For example, the comparison unit 222 may compare a maximum slip ratio of a front wheel portion having a large slip ratio among a plurality of front wheels with a maximum slip ratio of a rear wheel portion having a large slip ratio among a plurality of rear wheels. Moreover, the comparison unit 222 may compare an average value of slip ratios of a plurality of front wheels FR and FL with an average value of slip ratios of a plurality of rear wheels RR and RL.

The determination unit 224 may set braking distribution ratios of the front wheel portion and the rear wheel portion based on the comparison result from the comparison unit 222. Among the slip ratios of the front wheel portion and the rear wheel portion, a braking force of an axis with a large slip ratio is reduced and a braking force of an axis with a small slip ratio is increased, so that the deceleration/acceleration of the entire vehicle can be maintained. For example, when it is determined that the slip ratio of the front wheel portion is greater than the slip ratio of the rear wheel portion, the determination unit 224 may reduce the braking force of the front wheel portion and increase the braking force of the rear wheel portion. Moreover, when it is determined that the slip ratio of the front wheel portion is smaller than the slip ratio of the rear wheel portion, the determination unit 224 may increase the braking force of the front wheel portion and decrease the braking force of the rear wheel portion.

The drive unit 240 may include a front wheel braking device 242 and a rear wheel braking device 244.

The drive unit 240 may transmit a braking command to the front wheel braking device 242 and the rear wheel braking device 244 based on the braking distribution ratio of the front wheel portion and the rear wheel portion determined by the determination unit 224.

The front wheel braking device 242 and the rear wheel braking device 244 may use an Electro-Mechanical Brake (EMB). Using the EMB, the drive unit 240 may receive a braking signal for each wheel from the control unit 220. Specifically, the control unit 220 determines the braking force required for each of the wheels FR, FL, RR, and RL of the vehicle and calculates the braking signal corresponding to the determined braking force. The drive unit 240 may brake the vehicle by receiving the braking signal of each of the wheels FR, FL, RR, and RL calculated from the control unit 220.

Figure 3:
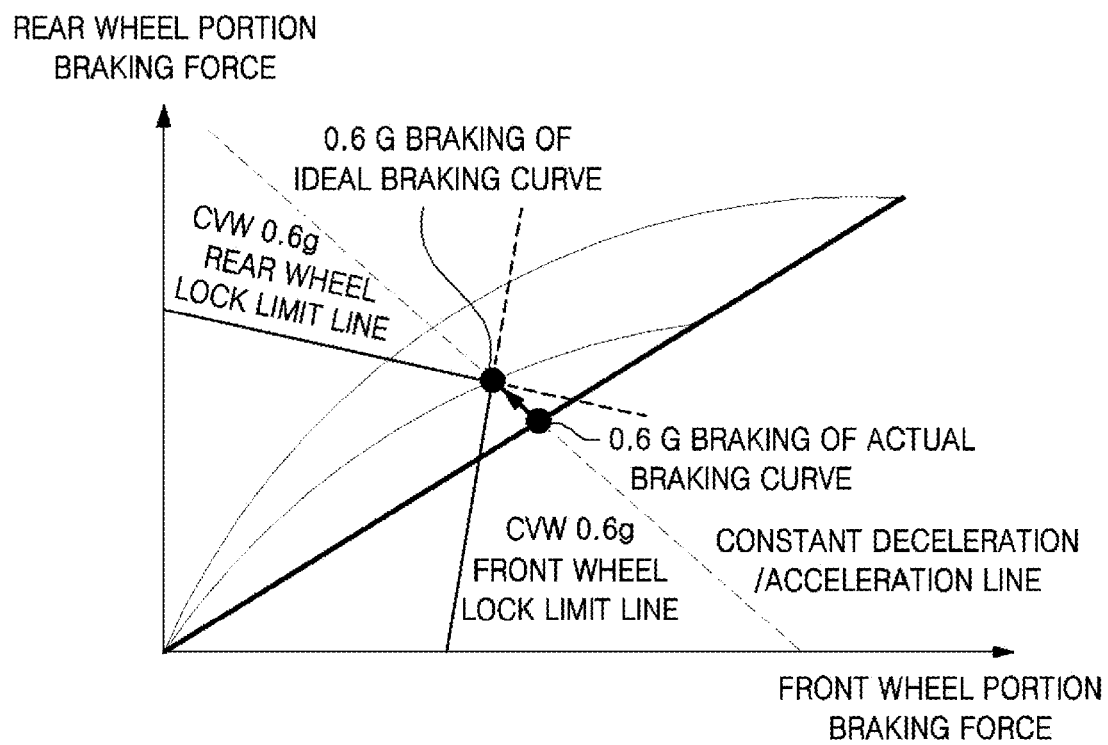
FIG. 3 is a Cartesian coordinate illustrating a distribution of braking force of a front wheel portion and braking force of a rear wheel portion according to one embodiment of the present disclosure.

FIG. 3 is a Cartesian coordinate illustrating the distribution of the braking force of the front wheel portion and the braking force of the rear wheel portion according to one embodiment of the present disclosure.

Referring to FIG. 1 and FIG. 3, FIG. 1 is the Cartesian coordinate illustrating a general braking force distribution when the target deceleration/acceleration based on the curb vehicle weight of the vehicle is 1 g. When traveling conditions such as the target deceleration/acceleration of the vehicle, the load of the vehicle, and the road surface friction coefficient change, in a case where the front wheel portion and rear wheel portion of the prior art form the braking distribution ratio on the actual braking curve, there is a problem that the wheel lock phenomenon occurring in the front wheel portion or the rear wheel portion cannot be prevented. On the other hand, in one embodiment of the present disclosure, slip ratios of the front wheel portion and the rear wheel portion of the vehicle are measured, and the measured slip ratios are compared with each other. The braking force of the axis having a large slip ratio is reduced, and the braking force of the axis having a small slip ratio is increased. Accordingly, the braking distribution ratio of the front wheel portion and the rear wheel portion may be moved from the actual braking curve to the ideal braking curve. When the braking distribution ratio of the front wheel portion and the rear wheel portion is braked based on the braking distribution ratio on the ideal braking curve, the wheel lock phenomenon can be minimized compared to a vehicle that brakes based on the braking distribution ratio on the actual braking curve. In addition, it is possible to shorten the braking distance of the vehicle and increase the braking efficiency of the vehicle. Here, g is a unit representing acceleration.

For example, when the target deceleration/acceleration of the vehicle is 0.6 g based on the maximum deceleration/acceleration of 1 g, a front wheel lock limit line and a rear wheel lock limit line are set based on a point corresponding to the target deceleration/acceleration (0.6 g) on the ideal braking curve based on the curb vehicle weight of the vehicle. The front wheel lock limit line and the rear wheel lock limit line are linear functions connected to each axis on the Cartesian coordinate from a contact point of the ideal braking curve and a constant deceleration/acceleration line. Here, the axes may include a horizontal axis representing a front wheel portion braking force and a vertical axis representing a rear wheel portion braking force. The front wheel lock limit line and the rear wheel lock limit line form a range in which wheel lock corresponding to the contact point of the ideal braking curve and the constant deceleration/acceleration line does not occur. That is, when the distribution of the braking force of the front wheel portion and the braking force of the rear wheel portion is outside a range in which wheel lock does not occur, the wheel lock phenomenon may occur in the vehicle. Here, the ideal braking curve is a curve illustrating that, when the vehicle brakes, the load of the vehicle is added to the front wheel portion so that the braking force of the front wheel portion is higher than the braking force of the rear wheel portion. The ideal braking curve may be calculated in response to the curb vehicle weight condition of the vehicle and the gross vehicle weight condition of the vehicle.

The constant deceleration/acceleration line is a linear function in which the braking deceleration/acceleration of the vehicle is kept constant. A slope of the constant deceleration/acceleration line corresponds to a gradient of the actual braking curve. For example, when the gradient of the actual braking curve is positive, the gradient of the constant deceleration/acceleration line may be negative.

The constant deceleration/acceleration line may intersect all points from one end of the ideal braking curve, that is, a point where the vehicle starts braking, to the other end of the ideal braking curve, that is, a point where the vehicle completes braking. For example, when the vehicle implements the deceleration/acceleration of 0.6 g based on the maximum deceleration/acceleration of 1 g, the vehicle may generate the braking forces of the front wheel portion and the rear wheel portion on the constant deceleration/acceleration line corresponding to 0.6 g. Here, the actual braking curve is a curve representing the braking force of the front wheel portion and the braking force of the rear wheel portion generated by a hydraulic brake disposed in the vehicle. Hydraulic pressure generated from a master cylinder (not illustrated) is transmitted to a wheel cylinder (not illustrated) of each wheel via a circuit (not illustrated). The plurality of front wheels FR and FL generate a braking force by causing friction between a brake pad (not illustrated) and a disk plate (not illustrated) using the transmitted hydraulic pressure. The plurality of rear wheels RR and RL generate the braking force by causing friction between a brake lining (not illustrated) and a drum brake (not illustrated) using the transmitted hydraulic pressure. The actual braking curve exhibits linear characteristics as a function of the braking force.

In order to derive an ideal braking distribution ratio considering the vehicle load and the road surface friction coefficient, the control unit 220 may compare the slip ratios of the front wheel portion and the rear wheel portion to increase or reduce the braking forces of the front wheel portion and the rear wheel portion. Here, the braking forces of the front wheel portion and the rear wheel portion may be moved from the braking distribution ratio on the actual braking curve to the braking distribution ratio based on the ideal braking curve along the constant deceleration/acceleration line. For example, when the target deceleration/acceleration of the vehicle is 0.6 g, the braking distribution ratio of the front wheel portion and the rear wheel portion may be formed as the braking distribution ratio on the ideal braking curve so as not to exceed the front wheel lock limit line and the rear wheel lock limit line.

When calculating the braking distribution ratio based on the ideal braking curve, the control unit 220 compares the slip ratios of the front wheel portion and the rear wheel portion to reduce the braking force of the axis with a large slip ratio and increase the braking force of the axis with a small slip ratio. Here, for example, when the target deceleration/acceleration of the vehicle is 0.6 g, the front wheel lock limit line is derived based on the contact point between the constant deceleration/acceleration line corresponding to the target deceleration/acceleration of 0.6 g and the ideal braking curve. Here, when the vehicle brakes based on the braking distribution ratio based on the actual braking curve, the braking force of the front wheel portion exceeds the front wheel lock limit line, and thus, the wheel lock may occur in the front wheel portion. Accordingly, the control unit 220 may reduce the braking force of the front wheel portion and increase the braking force of the rear wheel portion. Here, the braking distribution ratio of the front wheel portion and the rear wheel portion may be moved from the braking distribution ratio on the actual braking curve to the braking distribution ratio on the ideal braking curve. Accordingly, the braking force of the front wheel portion and the braking force of the rear wheel portion may be distributed within the front wheel lock limit line and the rear wheel lock limit line.

In one embodiment of the present disclosure, the process of braking the vehicle may be a process of braking the vehicle by setting the braking force of the front wheel portion and the braking force of the rear wheel portion based on the braking distribution ratio on the ideal braking curve. In addition, the braking force of the front wheel portion and the braking force of the rear wheel portion may be formed as the braking force within a range of the front wheel lock limit line and the rear wheel lock limit line.

In one embodiment of the present disclosure, the process of braking the vehicle may include a process of controlling the vehicle to brake by applying a safety factor to the slip ratio of the rear wheel portion by the control unit 220.

The safety factor is a value corresponding to a difference between the slip ratio of the front wheel portion and the slip ratio of the rear wheel portion. When the slip ratio of the front wheel portion is, for example, 15%, and the slip ratio of the rear wheel portion is, for example, 10%, the safety factor may be 5%. Here, the safety factor may always be a positive number. In order to stably control the attitude of the vehicle, the wheel lock phenomenon of the rear wheel portion should be prevented first rather than the wheel lock phenomenon of the front wheel portion. This is because if the wheel lock phenomenon occurs in the rear wheel portion, it may cause a more dangerous situation for the driver. When the vehicle brakes, the load of the vehicle is added to the front wheel portion. Specifically, a dynamic load of the vehicle is weighted on the front wheel portion of the vehicle by inertia forces. When the dynamic load of the vehicle is added to the front wheel portion of the vehicle, a frictional force between a tire (not illustrated) of the front wheel portion and the road surface increases, and a frictional force between a tire (not illustrated) of the rear wheel portion and the road surface decreases. Here, when the slip ratio of the front wheel portion is higher than the slip ratio of the rear wheel portion, the control unit 220 may control the vehicle by reducing the braking force of the front wheel portion and increasing the braking force of the rear wheel portion. However, when the braking force of the rear wheel portion is increased, there is a possibility of the wheel lock phenomenon occurring in the rear wheel portion. Accordingly, the slip ratio of the rear wheel portion may be corrected for the difference between the slip ratio of the front wheel portion and the slip ratio of the rear wheel portion by applying the safety factor to the slip ratio of the rear wheel portion. For example, when the difference occurs between the slip ratio of the front wheel portion and the slip ratio of the rear wheel portion due to conditions such as tire wear, a tire pattern, the road surface friction coefficient, and a road environment, the control unit 220 may correct the difference between the slip ratio of the front wheel portion and the slip ratio of the rear wheel portion by applying the safety factor to the slip ratio of the rear wheel portion.

Figure 4:
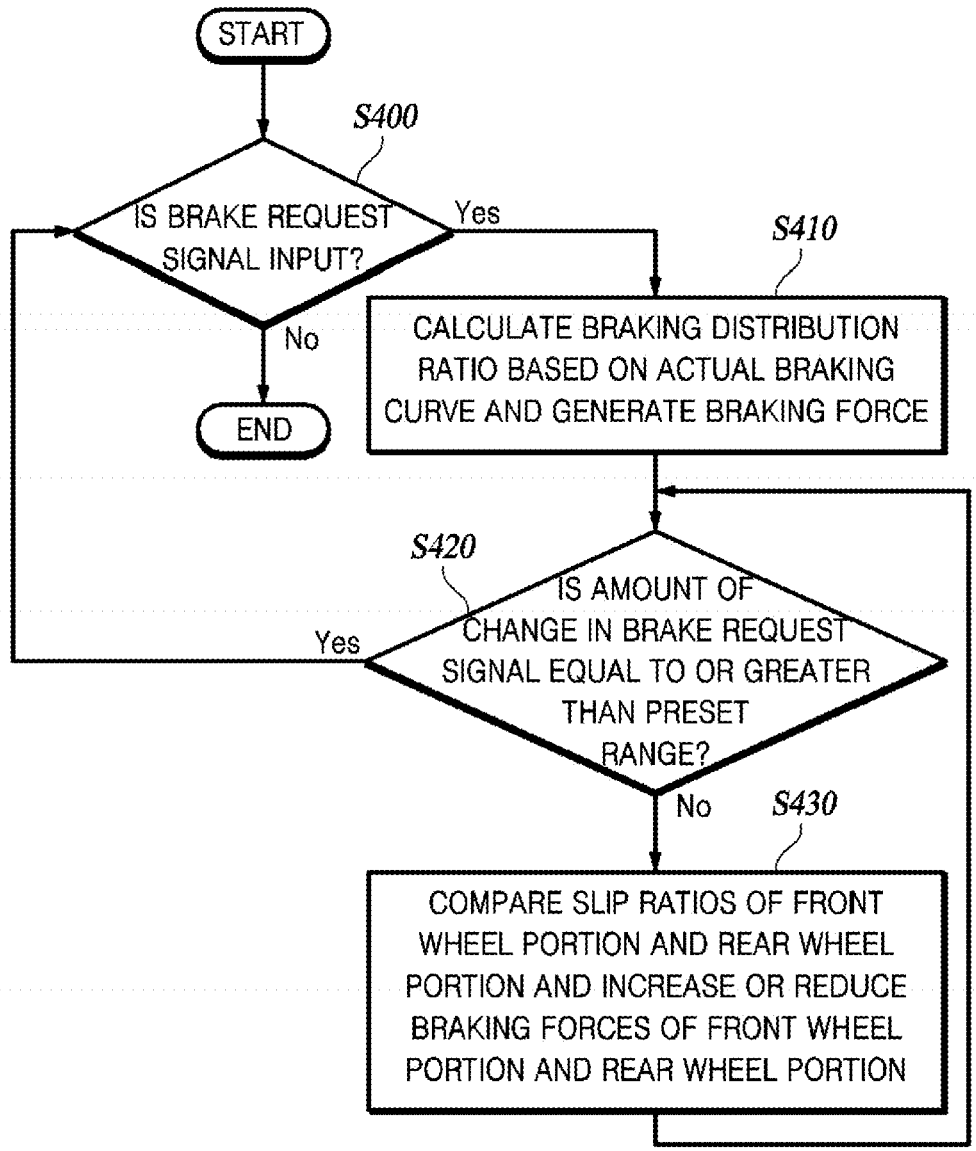
FIG. 4 is a flowchart illustrating a method of controlling a vehicle according to one embodiment of the present disclosure.

FIG. 4 is a flowchart illustrating a method of controlling a vehicle according to one embodiment of the present disclosure.

Referring to FIG. 3 and FIG. 4, whether a brake request signal is input to the vehicle is determined (S400). The brake request signal may be a pedal signal applied to a pedal of the vehicle. The control unit 220 may detect the pedal effort applied to the pedal using the pedal pressure sensor or the pedal stroke sensor.

The braking force is generated on the front wheel portion and the rear wheel portion based on the braking distribution ratio based on the actual braking curve (S410).

When the sensor unit 200 detects the pedal signal applied to the pedal, the control unit 220 may generate the braking forces of the front wheel portion and rear wheel portion based on the braking distribution ratio based on the actual braking curve to brake the vehicle.

Whether an amount of change in the brake request signal exceeds a preset range is determined (S420). The control unit 220 may determine whether the amount of change in the amount of pressure applied to the pedal exceeds a preset range.

In Step S420, when it is determined that the amount of change in the brake request signal does not exceed the preset range, the slip ratios of the front wheel portion and the rear wheel portion are compared with each other, and the braking forces of the front wheel portion and the rear wheel portion are increased or reduced based on the comparison result (S430).

The comparison unit 222 compares the slip ratio of the front wheel portion and the slip ratio of the rear wheel portion, and the determination unit 224 increases or reduces the braking forces of the front wheel portion and the rear wheel portion based on the comparison result to perform a subsequent control of the vehicle. Here, the subsequent control of the vehicle will be described in detail with reference to FIG. 5.

Figure 5:
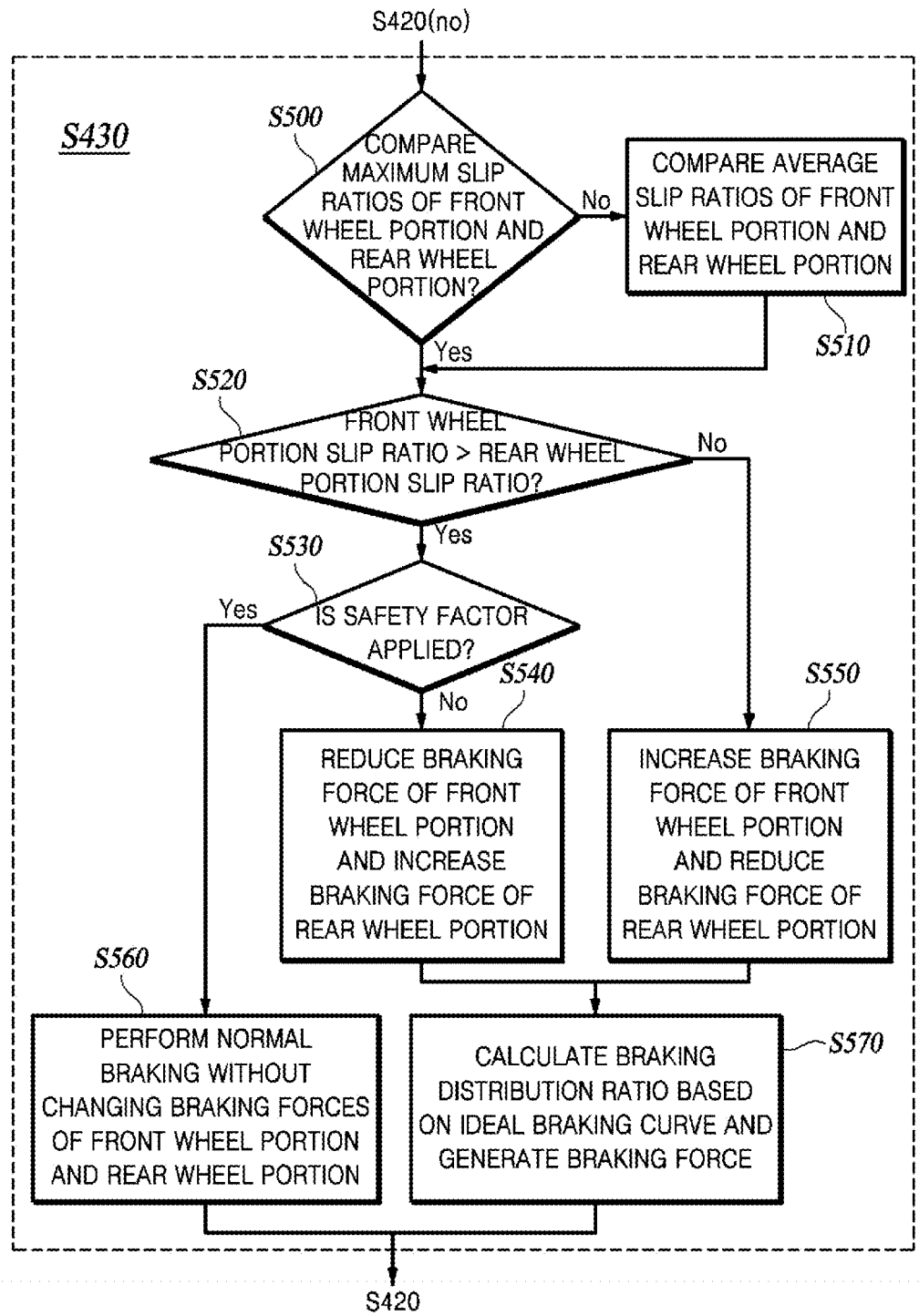
FIG. 5 is a flowchart illustrating Step S430 of FIG. 4 in detail.

FIG. 5 is a flowchart illustrating Step S430 of FIG. 4 in detail.

FIG. 5 illustrates that after Step S420 of FIG. 4, the control unit 220 may compare the slip ratios of the front wheel portion and the rear wheel portion, and increase or reduce the braking forces of the front wheel portion and the rear wheel portion based on the comparison result.

The front wheel portion may include the plurality of front wheels FR and FL, and the rear wheel portion may include the plurality of rear wheels RR and RL.

Referring to FIG. 5, whether to compare the maximum slip ratio of the front wheel portion with the maximum slip ratio of the rear wheel portion is determined (S500). The comparison unit 222 may compare a maximum slip ratio of the front wheel portion having a large slip ratio among the plurality of front wheels FR and FL with a maximum slip ratio of the rear wheel portion having a large slip ratio among the plurality of rear wheels RR and RL. The slip ratio is a value expressed as a percentage (%) of a slip amount of a slip phenomenon that occurs based on a difference between a speed of the vehicle and a rotational speed of the wheel.

In Step S500, when it is determined that the maximum slip ratios of the front wheel portion and the rear wheel portion are not compared with each other, average slip ratios of the front wheel portion and the rear wheel portion are compared with each other (S510). The comparison unit 222 may compare a front wheel portion average slip ratio obtained by averaging the slip ratios of the plurality of front wheels FR and FL with a rear wheel portion average slip ratio obtained by averaging the slip ratios of the plurality of rear wheels RR and RL.

The control unit 220 may select one of the step of comparing the maximum slip ratios of the front wheel portion and the rear wheel portion (S500) and the step of comparing the average slip ratios of the front wheel portion and the rear wheel portion (S510). The control unit 220 may select one of the method of comparing the maximum slip ratios of the front wheel portion and the rear wheel portion and the method of comparing the average slip ratios thereof based on information on the speed and load of the vehicle measured by the sensor unit 200, the status of the tire, the condition of the road surface, and the road surface friction coefficient, and may compare the slip ratio of the front wheel portion and the slip ratio of the rear wheel portion. The order of Step S500 and Step S510 may be changed.

Whether the slip ratio of the front wheel portion is greater than the slip ratio of the rear wheel portion is determined (S520). The comparison unit 222 may compare whether the slip ratio of the front wheel portion is greater than the slip ratio of the rear wheel portion in the slip ratio of the front wheel portion and the slip ratio of the rear wheel portion compared in Step S500 or Step S510. Here, the slip ratio of the front wheel portion may be the maximum slip ratio of the plurality of front wheels FR and FL or the average slip ratio of the plurality of front wheel slip ratios. Here, the slip ratio of the rear wheel portion may be the maximum slip ratio of the plurality of rear wheels RR and RL or the average slip ratio of the plurality of rear wheel slip ratios.

In Step S520, when it is determined that the slip ratio of the front wheel portion is greater than the slip ratio of the rear wheel portion, whether to apply a safety factor to the slip ratio of the rear wheel portion is determined (S530). The control unit 220 may apply the safety factor corresponding to the difference between the slip ratio of the front wheel portion and the slip ratio of the rear wheel portion. That is, the control unit 220 may apply the same slip ratio of the rear wheel portion as the slip ratio of the front wheel portion by correcting the safety factor to the slip ratio of the rear wheel portion. When the slip ratio of the rear wheel portion and the slip ratio of the front wheel portion are the same, the braking distribution ratio of the front wheel portion and the rear wheel portion may be formed based on a braking distribution ratio on the actual braking curve or the ideal braking curve.

In Step S530, when the safety factor is applied to the slip ratio of the rear wheel portion, the control unit 220 calculates the braking distribution ratio based on the ideal braking curve without changing and controlling the braking forces of the front wheel portion and the rear wheel portion and brakes the vehicle (S560). The control unit 220 may apply the safety factor to the slip ratio of the rear wheel portion. The difference between the slip ratio of the front wheel portion and the slip ratio of the rear wheel portion can be corrected by applying the safety factor to the slip ratio of the rear wheel portion. The control unit 220 may correct the difference between the slip ratio of the front wheel portion and the slip ratio of the rear wheel portion, which change according to the speed and load of the vehicle measured by the sensor unit 200, the status of the tire, the condition of the road surface, and the road surface friction coefficient.

In Step S530, when it is determined that the safety factor is not applied to the slip ratio of the rear wheel portion, the braking force of the front wheel portion is reduced and the braking force of the rear wheel portion is increased (S540). When it is determined that the slip ratio of the front wheel portion is greater than the slip ratio of the rear wheel portion, the control unit 220 reduces the braking force of the front wheel portion and increases the braking force of the rear wheel portion. Here, the braking distribution ratio of the front wheel portion and the rear wheel portion are moved from the contact point of the actual braking curve on the constant deceleration/acceleration line to the contact point of the ideal braking curve. Therefore, the braking force of the front wheel portion is located within the range of the front wheel lock limit line, and the wheel lock phenomenon of the front wheel portion may be prevented or delayed.

In Step S520, when it is determined that the slip ratio of the front wheel portion is not greater than the slip ratio of the rear wheel portion, the braking force of the front wheel portion is increased and the braking force of the rear wheel portion is reduced (S550).

When it is determined that the slip ratio of the front wheel portion is smaller than the slip ratio of the rear wheel portion, the control unit 220 increases the braking force of the front wheel portion and reduces the braking force of the rear wheel portion. Here, the braking distribution ratio of the front wheel portion and the rear wheel portion may be calculated based on the distribution ratio on the constant deceleration/acceleration line.

After Step S540 and Step S550, the braking forces of the front wheel portion and the rear wheel portion are formed based on the braking distribution ratio on the ideal braking curve, and the braking force of the vehicle is generated based on the formed braking distribution ratio (S570). Based on the braking distribution ratio formed based on the changed braking forces of the front wheel portion and the rear wheel portion, the control unit 220 may brake the vehicle using the front wheel braking device 242 and the rear wheel braking device 244.

After Step S560 and Step S570, Step S420 may be performed. That is, after the control unit 220 generates the braking force on the front wheel portion and the rear wheel portion based on the braking distribution ratio on the ideal braking curve, whether the amount of the change in the brake request signal is equal to or greater than the preset range may be determined.

In one embodiment of the present disclosure, according to the braking device of a vehicle and the method of controlling the same, it is possible to generate the braking forces of the front wheel portion and the rear wheel portion based on the braking distribution ratio satisfying the traveling condition of the vehicle using an Electro-Mechanical Brake (EMB) and increase the braking efficiency of the vehicle by slowing down the wheel lock phenomenon of the vehicle.

In one embodiment of the present disclosure, according to the braking device of a vehicle and the method of controlling the same, it is possible to shorten the braking distance of the vehicle by maximizing the braking efficiency and braking performance of the vehicle.

Various implementations of the systems and techniques described herein may be realized by digital electronic circuits, integrated circuits, field programmable gate arrays (FPGAs), application specific integrated circuits (ASICs), computer hardware, firmware, software, and/or a combination thereof. These various implementations may include being implemented as one or more computer programs executable on a programmable system. A programmable system includes at least one programmable processor (which may be a special purpose processor or may be a general-purpose processor) coupled to receive data and instructions from and transmit data and instructions to a storage system, at least one input device, and at least one output device. Computer programs (also known as programs, software, software applications or code) contain instructions for a programmable processor and are stored on a "computer-readable medium".

A computer-readable recording medium includes all types of recording devices in which data that can be read by a computer system is stored. These computer-readable recording media may be non-volatile or non-transitory media such as ROM, CD-ROM, magnetic tape, floppy disk, memory card, hard disk, magneto-optical disk, and storage device, and may further include a transitory medium such as a data transmission medium. Moreover, computer-readable recording media may be distributed in computer systems connected through a network, and computer-readable codes may be stored and executed in a distributed manner.

In the flowcharts/timing diagrams of the present specification, it is described that each process is sequentially executed, but this is merely an example of the technical idea of one embodiment of the present disclosure. In other words, a person with ordinary knowledge in the technical field to which one embodiment of the present disclosure belongs may change and execute the order described in the flowchart/timing diagram within the range that does not deviate from the essential characteristics of one embodiment of the present disclosure, or may apply various modifications and variations by executing one or more of the processes in parallel, and thus, the flow chart/timing chart is not limited to a time-series sequence.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, one of ordinary skill should understand that the scope of the present disclosure is not to be limited by the above explicitly described embodiments but by the claims and equivalents thereof

What is claimed is:

1. A method of braking a vehicle, the method comprising:
   determining whether a brake request signal is input;
   determining whether an amount of change in the brake request signal is equal to or greater than a preset standard;
   comparing a slip ratio of a front wheel portion with a slip ratio of a rear wheel portion in response to a determination that the amount of change in the brake request signal is equal to or less than the preset standard;
   reducing a braking force of a shaft having a large slip ratio of the front wheel portion and the rear wheel portion and increasing a braking force of a shaft having a small slip ratio, based on a comparison result after the comparing of the slip ratio of the front wheel portion with the slip ratio of the rear wheel portion;
   moving a braking distribution ratio formed based on the increased or reduced braking forces of the front wheel portion and the rear wheel portion from an actual braking curve to an ideal braking curve, after the reducing of the braking force of the shaft having a large slip ratio of the front wheel portion and the rear wheel portion and the increasing of the braking force of the shaft having a small slip ratio; and
   braking the vehicle based on the braking distribution ratio on the actual braking curve or the moved braking distribution ratio on the ideal braking curve.

2. The method of claim 1, wherein the comparing of the slip ratio of the front wheel portion and the slip ratio of the rear wheel portion includes comparing magnitudes between the slip ratio of the front wheel portion and the slip ratio of the rear wheel portion.

3. The method of claim 1, wherein the comparing the slip ratio of the front wheel portion with the slip ratio of the rear wheel portion comprises:
   comparing a maximum slip ratio of a front wheel portion having a high slip ratio among the plurality of front wheels with a maximum slip ratio of a rear wheel portion having a high slip ratio among the plurality of rear wheels, wherein the front wheel portion includes a plurality of front wheels, and the rear wheel portion includes a plurality of rear wheels, and
   comparing an average slip ratio of the front wheel portion obtained by averaging slip ratios of the plurality of front wheels with an average slip ratio of the rear wheel portion obtained by averaging slip ratios of the plurality of rear wheels.

4. The method of claim 1, wherein the moving the braking distribution ratio formed based on the increased or reduced braking forces of the front wheel portion and the rear wheel portion from the actual braking curve to the ideal braking curve includes: forming the braking distribution ratio of the front wheel portion and the rear wheel portion based on the actual braking curve in response to a determination that a difference between a road surface friction force corresponding to a road surface friction coefficient and the braking force of the vehicle is within a preset range.

5. The method of claim 1, wherein the comparing the slip ratio of the front wheel portion with the slip ratio of the rear wheel portion includes: when a difference between the slip ratio of the front wheel portion and the slip ratio of the rear wheel portion occurs, applying a safety factor to the slip ratio of the rear wheel portion to correct the difference between the slip ratio of the front wheel portion and the slip ratio of the rear wheel portion and brake the vehicle.

6. The method of claim 5, wherein the safety factor is a value corresponding to a difference of the slip ratio of the rear wheel portion compared to the slip ratio of the front wheel portion.

7. A braking apparatus of a vehicle, the braking apparatus comprising:
- a sensor configured to measure a slip ratio of a front wheel portion and a slip ratio of a rear wheel portion to calculate a braking distribution ratio of the front wheel portion including a plurality of front wheels and the rear wheel portion including a plurality of rear wheels;
- a control unit configured to change braking forces of the front wheel portion and the rear wheel portion based on the slip ratio of the front wheel portion and the slip ratio of the rear wheel portion measured by the sensor and perform control to brake the vehicle based on the braking distribution ratio on an actual braking curve or a moved braking distribution ratio on an ideal braking curve; and
- a drive unit including a front wheel driving apparatus which generates the braking force on the front wheel portion and a rear wheel driving apparatus which generates the braking force on the rear wheel portion based on the control of the control unit.

8. The braking apparatus of claim 7, wherein the control unit includes: a comparison unit configured to compare a magnitude between the slip ratio of the front wheel portion and the slip ratio of the rear wheel portion; and
- a determination unit configured to determine the braking force required for the front wheel portion and the rear wheel portion based on a comparison result from the comparison unit.

9. The braking apparatus of claim 7, wherein the control unit is configured to compare a maximum slip ratio of a front wheel portion having a large slip ratio among the plurality of front wheels with a maximum slip ratio of the rear wheel portion having a large slip ratio among the plurality of rear wheels, and compare a front wheel average slip ratio obtained by averaging the slip ratios of the plurality of front wheels with a rear wheel average slip ratio obtained by averaging the slip ratios of the plurality of rear wheels.

10. The braking apparatus of claim 7, wherein the control unit is configured to determine whether a difference between a road surface friction force corresponding to a road surface friction coefficient and the braking force of the vehicle is within a preset range, and perform control to form the braking distribution ratio of the front wheel portion and the rear wheel portion based on the actual braking curve in response to a determination that the difference between the road surface friction force and the braking force of the vehicle is within the preset range.

11. The braking apparatus of claim 7, wherein when a difference between the slip ratio of the front wheel portion and the slip ratio of the rear wheel portion occurs, the control unit performs control to apply a safety factor to the slip ratio of the rear wheel portion to correct the difference between the slip ratio of the front wheel portion and the slip ratio of the rear wheel portion and brake the vehicle.

* * * * *